(12) United States Patent
Tapio

(10) Patent No.: US 6,799,021 B1
(45) Date of Patent: Sep. 28, 2004

(54) METHOD AND ARRANGEMENT FOR FORMING AN ADDRESS

(75) Inventor: Olli Tapio, Jääli (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/380,701

(22) PCT Filed: Mar. 13, 1998

(86) PCT No.: PCT/FI98/00225

§ 371 (c)(1),
(2), (4) Date: Nov. 29, 1999

(87) PCT Pub. No.: WO98/42082

PCT Pub. Date: Sep. 24, 1998

(30) Foreign Application Priority Data

Mar. 17, 1997 (FI) .................................................. 971121

(51) Int. Cl.$^7$ ................................................. H04B 1/04
(52) U.S. Cl. ................................. 455/114.3; 455/114.2; 455/114.1; 455/126; 455/127.3; 375/296; 375/297; 330/149
(58) Field of Search ................................ 455/127, 114, 455/126, 63; 375/296, 297; 330/149

(56) References Cited

U.S. PATENT DOCUMENTS

| | | | | |
|---|---|---|---|---|
| 4,462,001 A | * | 7/1984 | Girard | 330/149 |
| 5,008,741 A | * | 4/1991 | Knierim et al. | 348/675 |
| 5,138,144 A | | 8/1992 | Sakamoto | 250/208 |
| 5,524,286 A | * | 6/1996 | Chiesa et al. | 455/126 |
| 5,650,758 A | * | 7/1997 | Xu et al. | 330/149 |
| 5,732,333 A | * | 3/1998 | Cox et al. | 455/126 |
| 5,740,520 A | * | 4/1998 | Cyze et al. | 455/69 |
| 5,867,065 A | * | 2/1999 | Leyendecker | 330/149 |
| 5,900,778 A | * | 5/1999 | Stonick et al. | 330/149 |
| 5,920,596 A | * | 7/1999 | Pan et al. | 375/238 |
| 5,920,808 A | * | 7/1999 | Jones et al. | 455/127 |
| 6,141,390 A | * | 10/2000 | Cova | 375/297 |
| 6,285,412 B1 | * | 9/2001 | Twitchell | 348/608 |

FOREIGN PATENT DOCUMENTS

EP        0 240 055        10/1987
WO        97/49174         12/1997

OTHER PUBLICATIONS

Patent Abstracts of Japan, abstract of JP 8–251246 A (MATSUSHITA ELECTRIC IND CO LTD), Sep. 27, 1996.

* cited by examiner

*Primary Examiner*—William Trost
*Assistant Examiner*—Danh Le
(74) *Attorney, Agent, or Firm*—Pillsbury Winthrop LLP

(57) ABSTRACT

A method and arrangement for forming an address for use in signal predistortion. The arrangement is used to form a corrector table address employed in the signal predistortion to compensate for signal distortions. The signal distortions are compensated for using corrector coefficients that are placed in the corrector table and retrieved from the table on the basis of the address. The arrangement includes calculation means that, on the basis of the received signal, calculate a result corresponding to the squaring of a received signal. The arrangement further comprises summing means that, if required, sum up the results corresponding to the squaring, the sum forming a base address. The arrangement further comprises error correction means that correct the calculated base address by means of an address correction value.

23 Claims, 1 Drawing Sheet

METHOD AND ARRANGEMENT FOR FORMING AN ADDRESS

FIELD OF THE INVENTION

The invention relates to a method for forming an address, which method is employed in signal predistortion used for compensating for signal distortions by means of corrector coefficients placed in a corrector table, the corrector coefficients being retrieved from the corrector table on the basis of the address.

The invention also relates to an arrangement for forming a corrector table address used for signal predistortion which is used for compensating for signal distortions by means of corrector coefficients placed in a corrector table, the corrector coefficients being retrieved from the corrector table on the basis of the address.

DESCRIPTION OF THE PRIOR ART

Many electronic components bring about signal distortion when the signal is processed by the component. In practice, signal distortion is problematic especially in amplifiers. Distortion in the amplifier is caused by the non-linearity of the amplifier. The signal to be amplified can also become distorted because of too strong an input signal or because of for example a shift in the standby operating point of the amplifier. It is possible to reduce distortion for example by a feedback.

Linear modulation methods that enable a spectrum to be used efficiently are becoming more common in mobile systems. However, the linear modulation methods require that the amplifier must be as linear as possible. However, the power amplifiers in use cause intermodulation distortion to the signal. Intermodulation distortion occurs when the amplifier generates harmonic waves, i.e. new frequencies. More precisely, intermodular distortion occurs when an excitation signal comprises oscillation at different frequencies. In that case, the response comprises a number of signal whose frequencies are sums and differences of the excitation frequencies and their multifolds.

Distortion in the amplifier can further depend for example on the magnitude of capacitance and inductance in the amplifier. Mobile systems contain for example AM-AM or AM-PM intermodular distortion (AM=Amplitude Modulation, PM=Phase Modulation). Distortion caused by intermodulation distortion is presented for example by means of a signal state diagram. The signal state diagram can be presented by means of coordinates. The AM-AM distortion causes signal state points to shift closer to the origin. The AM-PM distortion, on the other hand, causes the signal state points to move round the origin.

Various linearization methods are used to correct and compensate for the amplifier-induced signal distortion. Prior art methods employ digital predistortion in linearization. In digital predistortion, a baseband signal is corrected by means of correction coefficients stored in a table. The correction coefficients are retrieved on the basis of an address that has been calculated from an input signal. An input signal amplitude, i.e. the square root of the input signal, is used as the address. However, calculating the square root reduces calculation capacity. In addition, implementing the calculation is complicated.

For example U.S. Pat. No. 5,138,144 presents an error compensation method associated with image reading equipment, the method comprising address information calculations. However, calculating address information is time-based. More precisely, calculating an address is based on a clock pulse.

BRIEF DESCRIPTION OF THE INVENTION

The object of the present invention is to change the address distribution of a corrector table on the basis of the amplitude distribution of an input signal.

This object is achieved by the method of the type presented in the introduction, characterized by calculating a base address on the basis of a signal, summing up the signal components of a signal composed of signal components, correcting the calculated base address by an address correction value, calculating a corrector table address on the basis of the base address and the corrected base address.

This object is also achieved by the arrangement of the invention, characterized in that the arrangement comprises calculation means that, on the basis of a received signal, calculate a result corresponding to the squaring of the received signal, summing means that, if required, sum up the results corresponding to the squaring, the sum forming a base address, and error correction means that correct the above calculated base address by means of an address correction value.

The method of the invention provides many advantages. The method enables a correction table address to be formed without complicated calculations. According to the method, a base address is formed before forming the actual corrector table address. The actual address is obtained by suitably processing the base address, the actual address then being used as the corrector table address. Processing the base address is carried out by using address correction means that correct the above calculated base address. Processing is carried out by means of address correcting values. The address correcting values arranged to the input signal enable an optimal corrector table address to be formed. The optimal address enables a distortion to be accurately compensated for.

BRIEF DESCRIPTION OF THE DRAWINGS

The invention will be described in more detail with reference to the examples in the attached drawings, in which.

DETAILED DESCRIPTION OF THE PREFERRED EMBODIMENTS

Figure 1:
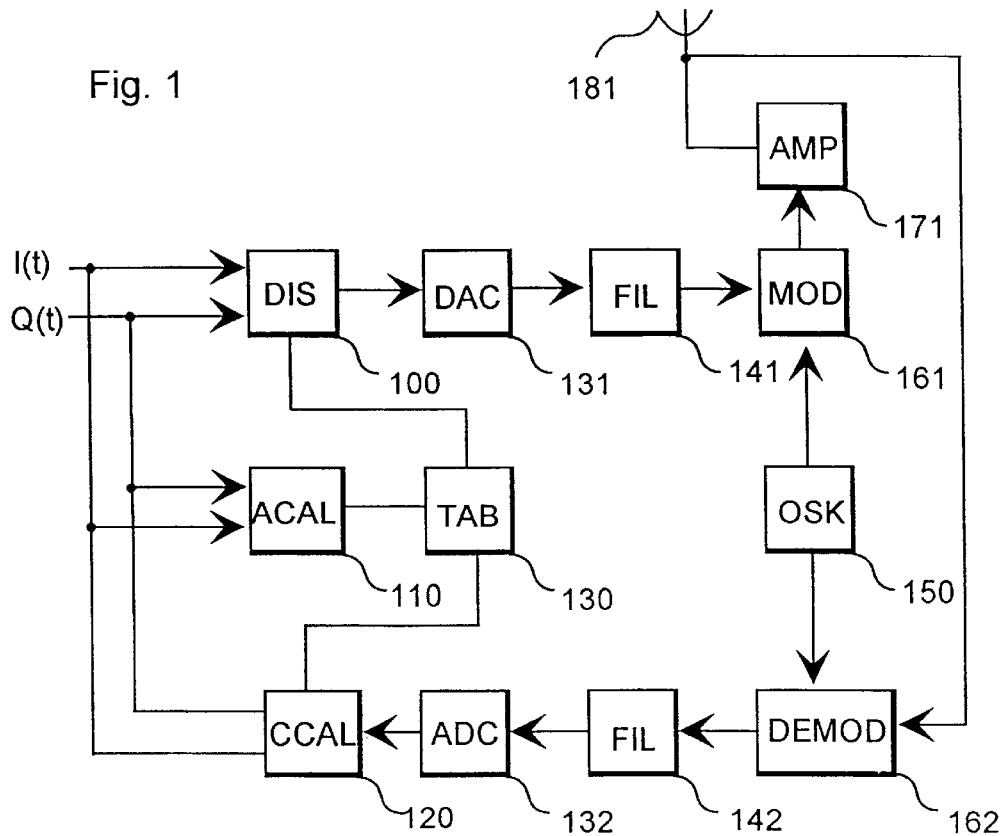
FIG. 1 is a schematic block diagram of a transceiver employing digital predistortion.

FIG. 1 is a block diagram of a transceiver arrangement using digital predistortion. The arrangement comprises predistortion means 100, calculation means 110 and calculation means 120. In the arrangement of the figure, two signal components I(t) and Q(t) are introduced to the predistortion means 100. The signal components are also applied to both the calculation means 110 and 120. The calculation means 120 calculate corrector coefficients.

The arrangement further comprises means 130 for establishing a corrector table. The corrector table comprises the corrector coefficients calculated by the calculation means 120. The calculation means 110 calculate an address on the basis of the received signal components, the address being used for retrieving the corrector coefficients from the corrector table. The corrector coefficients are applied to the predistortion means 100 that compensate for signal distortions by means of the corrector coefficients.

The arrangement further comprises a converter element 131, a converter element 132, filter means 141,142, and an oscillator 150. The converter element 131 is connected to the predistortion means 100 that supply digital signals to the converter element 131. The converter element 132 is connected to the calculation means 120. The converter element 132 receives analogue signals. The converter element 132 converts the received analogue signal into a digital signal that is sent to the calculation means 120. The arrangement further comprises a modulator and a demodulator 161,162. The oscillator 150 generates a signal that is applied to the modulator 161 and to the demodulator 162. The arrangement further comprises an amplifier 171 connected to the modulator 161. The arrangement further comprises an antenna 181 acting as a transceiver antenna in the solution according to the figure.

The filter means 141 receive analogue signals arriving from the converter element 131. The filter means 141 low-pass filter the received signal. The signal filtered by the filter means 141 is applied to the modulator 161. In the modulator 161, a signal generated by an oscillator 151 is modulated by the signal coming from the filter means 141. The modulated signal is applied to the amplifier 171 that amplifies the signal. After the amplification, the signal is sent through the antenna 181 to the radio path.

The antenna 181 receives analogue signals from the radio path, the signals upon receiving being applied to the demodulator 162. In the demodulator, the signal generated by the oscillator 151 is modulated by the signal coming from the antenna 181. The demodulated signal is applied to the filter means 142 that filter the signal. After filtering, the signal is converted into a digital signal in the converter element 132.

Figure 2:
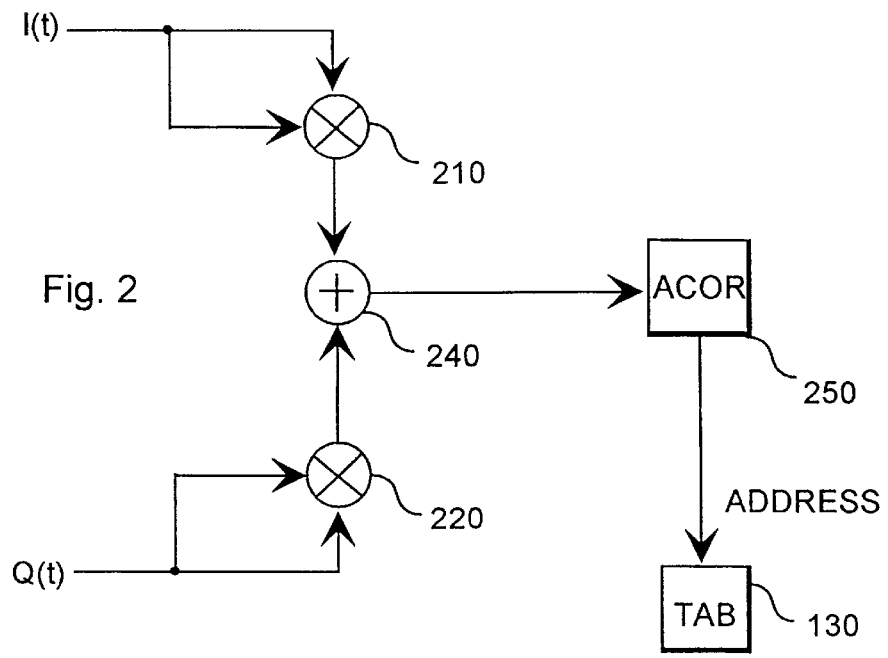
FIG. 2 illustrates an arrangement used for forming a corrector table address used for digital predistortion.

FIG. 2 shows an arrangement used for forming an address for the corrector coefficients placed in a corrector table. The figure thus presents the structure of the calculation means 110 in more detail. The arrangement comprises calculation means 210, 220, and a summing means 240. The summing means 240 is connected to the calculation means 210, 220. The summing means receives signals from the means 210, 220. In the arrangement of the figure, the calculation means 210 receives a signal I(t). The calculation means 210 processes the received signal in such a way that the strength of the signal obtained from the output of the calculation means 210 is $I^2(t)$. The calculation means 220 receives a signal Q(t). The means 220 processes by preferably squaring the received signal in such a way that the strength of the signal obtained from the output of the calculation means 220 is $Q^2(t)$. In practice, the calculation means 210, 220 are implemented by a DSP technique.

The output signals $I^2(t)$ and $Q^2(t)$ of the calculation means 210, 220 are applied to the summing means 240 that sums up the received signals. The calculation means 210, 220 generate an output signal for example by multiplying their input signals by each other. The output signal can also be generated by using other types of calculation methods. The signal obtained from the output of the summing means 240 forms a base address. The base address is thus formed by squaring the input signals of the calculation means 210, 220. In practice, the squaring of the input signals corresponds to the calculation of the power of the input signals. Calculating an address according to the arrangement of the invention is thus based on the level of the input signal.

The arrangement further comprises address correction means 250 in connection with the summing means 240. The base address formed by the summing means 240 is conveyed to the address correction means 250 that corrects the above calculated base address by means of an address correction value. The base address corrected in the address correction means 250 is used as an actual address (ADDRESS) of the corrector table. A corrector co-efficient is retrieved from the corrector table on the basis of the corrector table address that has been formed, the corrector coefficient compensating for signal distortions.

In practice, the address correction values in the address correction means 250 are placed for example in a table 130. The address correction values arranged in the input signal enable an optimal address to be formed for the distortion corrector table. The values of the address correction table are preferably formed on the basis of the amplitude distribution of the input signal. The effect of the modulation method used is taken into account when generating values for the address correction table. The optimal address enables the use of an optimal corrector coefficient, whereby signal distortions can be accurately compensated for.

Although the invention has been described above with reference to the examples illustrated in the attached drawings, it is obvious that the invention is not restricted thereto but it can be modified in many ways within the scope of the inventive idea presented in the attached claims.

What is claimed is:

1. A method for forming an address that is employed in signal predistortion to compensate for signal distortions by means of corrector coefficients placed in a corrector table, the corrector coefficients being retrieved from the corrector table on the basis of the address, the method comprising:
    calculating a base address on the basis of a level of an input signal;
    correcting the calculated base address utilizing an address correction value according to an amplitude distribution of the input signal; and
    calculating a corrector table address on the basis of the calculated base address and the corrected base address in an address correction table,
    wherein the base address is calculated based on a sum of squaring at least one signal component of the input signal.

2. The method as claimed in claim 1, wherein the base address is calculated by calculating a result corresponding to the squaring of the level of the input signal.

3. The method as claimed in claim 1, wherein the base address is calculated from an input signal composed of signal components in such a way that results corresponding to the squaring of single signal components are summed up.

4. The method as claimed in claim 1, wherein the input signal is composed of multiple signal components, the signal components are squared separately, after which the squared signal components are summed together.

5. The method as claimed in claim 1, wherein the base address is calculated based upon the power of the input signal.

6. The method as claimed in claim 1, wherein, when the method is used in association with different modulation methods, an address correction value is formed according to a modulation method used.

7. The method as claimed in claim 1, wherein, when the method is used in association with different modulation methods, the base address is corrected according to a manner required by the modulation method used.

8. The method as claimed in claim 1, wherein the method for forming an address is employed in association with digital predistortion.

9. The method as claimed in claim 1, wherein the signal components are I and Q signal components of a digital modulation.

10. An arrangement for forming a corrector table address for use with signal predistortion, the arrangement being used to compensate for signal distortions using corrector coefficients placed in the corrector table, the corrector coefficients being retrieved from the corrector table on the basis of a base address, the arrangement comprising:
    calculation means that, on the basis of a received signal, calculate a result that corresponds to squaring of the received signal; and
    an address correction table configured to correct the base address according to the amplitude distribution of the received signal utilizing an address correction value, wherein the base address is calculated based on a sum of squaring at least one signal component of the input signal.

11. An arrangement as claimed in claim 10, wherein the calculation means calculate the base address by forming a result from the received signal, the result corresponding to the squaring of said received signal.

12. An arrangement as claimed in claim 10, wherein the received signal is composed of signal components, and the calculation means squares the signal components separately and the arrangement further comprises a summing means that sums the squared signal components to produce a base address.

13. An arrangement as claimed in claim 10, wherein the calculation means calculates the base address on the basis of the power level of the received signal.

14. An arrangement as claimed in claim 10, wherein the address correction table is used to correct an address on the basis of which the corrector coefficient is retrieved from the corrector table, the corrector coefficient being used to compensate for signal distortions.

15. An arrangement as claimed in claim 10, wherein the address correction table generates the address correction values according to a predetermined modulation method.

16. An arrangement as claimed in claim 10, wherein the arrangement is used in association with digital predistortion.

17. An arrangement as claimed in claim 10, wherein the calculation means calculate the base address from I and Q signal components of a digital modulation.

18. A method for forming an address in signal predistortion to compensate for signal distortions using corrector coefficients placed in a corrector table, the corrector coefficients being retrieved from the corrector table on the basis of the formed address, the method comprising:

calculating a base address on the basis of a received signal;

conveying the base address to an address correction table; and correcting the calculated base address according to an amplitude distribution of the received signal using an address correction value in the address correction table to produce an actual address for the corrector table, wherein the base address is calculated based on a sum of squaring at least one signal component of the input signal.

19. A method for forming an address during signal predistortion used to compensate for signal distortions using corrector coefficients placed in a corrector table, the corrector coefficients being retrieved from the corrector table on the basis of the address, the method comprising:

calculating a base address on the basis of a received signal;

conveying the base address according to an address correction table;

correcting the base address according to an amplitude distribution of the received signal in the address correction table; and forming an address used as an actual address for the corrector table based on the base address in the address correction table, wherein the base address is calculated based on a sum of squaring at least one signal component of the input signal.

20. An arrangement for forming a corrector table address during signal predistortion to compensate for signal distortions using corrector coefficients placed in a corrector table, the corrector coefficients being retrieved from the corrector table on the basis of the correction table address, the arrangement comprising:

means for forming a base address on the basis of a received signal; and an address correction table for forming an address according to an amplitude distribution of the received signal by correcting the base address by means of an address correction value, the address being used as an actual address for the corrector tables, wherein the base address is calculated based on a sum of squaring at least one signal component of the input signal.

21. An arrangement for forming a corrector table address used for signal predistortion to compensate for signal distortions using corrector coefficients placed in a corrector table, the corrector coefficients being retrieved from the corrector table on the basis of the corrector table address, the arrangement comprising:

means for forming a base address on the basis of a received signal; and an address correction table for forming an address according to an amplitude distribution of the received signal based on the base address, the address being used as an actual address for the corrector table, wherein the base address is calculated based on a sum of squaring at least one signal component of the input signal.

22. A method of forming an address that is employed in signal predistortion to compensate for signal distortions by means of corrector coefficients placed in a corrector table, the corrector coefficients being retrieved from the corrector table on the basis of the address, the method comprising:

calculating a base address as a sum of squared values of I and Q part of an input signal;

correcting the calculated base address utilizing an address correction value according to an amplitude distribution of the input signal; and calculating a corrector table address on the basis of the calculated base address and the corrected base address in an address correction table, wherein the base address is calculated based on a sum of squaring at least one signal component of the input signal.

23. An arrangement for forming an address that is employed in signal predistortion to compensate for signal distortions by means of corrector coefficients placed in a corrector table, the corrector coefficients being retrieved from the corrector table on the basis of the address, the arrangement comprising:

a squaring element configured to square an I signal of an input signal;

a squaring element configured to square a Q signal of an input signal;

a summer configured to form a base address as a sum of squared values of I and Q part of an input signal; and address correction table configured to calculate a corrector table address on the basis of the calculated base address, wherein the base address is calculated based on a sum of squaring at least one signal component of the input signal.

* * * * *